United States Patent
Johnson et al.

(10) Patent No.: US 7,229,578 B2
(45) Date of Patent: Jun. 12, 2007

(54) LIGHT WEIGHT PLASTIC TRIM PARTS AND METHODS OF MAKING SAME

(75) Inventors: Daniel R. Johnson, Germantown, OH (US); Andrew G. Yorde, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 229 days.

(21) Appl. No.: 10/487,515

(22) PCT Filed: Jul. 25, 2002

(86) PCT No.: PCT/US02/23593

§ 371 (c)(1),
(2), (4) Date: Jul. 6, 2004

(87) PCT Pub. No.: WO03/018284

PCT Pub. Date: Mar. 6, 2003

(65) Prior Publication Data

US 2004/0241367 A1   Dec. 2, 2004

Related U.S. Application Data

(60) Provisional application No. 60/314,226, filed on Aug. 22, 2001.

(51) Int. Cl.
*B29C 44/06* (2006.01)
*B29D 22/00* (2006.01)

(52) U.S. Cl. .................. 264/46.4; 264/46.6; 264/50; 264/572

(58) Field of Classification Search ............ 264/46.4, 264/46.6, 50, 54, 572
See application file for complete search history.

(56) References Cited

U.S. PATENT DOCUMENTS

| | | | |
|---|---|---|---|
| 3,796,779 | A | 3/1974 | Greenberg |
| 4,473,665 | A | 9/1984 | Martini-Vvedensky et al. |
| 5,110,533 | A | 5/1992 | Hendry |
| 5,149,546 | A | 9/1992 | Nelson |
| 5,162,092 | A | 11/1992 | Klobucar et al. |
| 5,281,376 | A * | 1/1994 | Hara et al. .............. 264/46.4 |

(Continued)

FOREIGN PATENT DOCUMENTS

DE    197 51 236 A1    6/1999

OTHER PUBLICATIONS

Knights, Mikell, "Foam Frenzy—Microcellular Molding Takes Off", Sep. 2000, Reprinted from Plastics Technology, pp. 1-6.
Trexel Inc. website, www.trexel.com, 4 pages.
"Genesis Plastics and Engineering is the first licensee of the MuCell™ Microcellular foam technology in the Midwest", 1 page.
PPI, "Design & Engineering", 3 pages.

(Continued)

*Primary Examiner*—Allan R. Kuhns
(74) *Attorney, Agent, or Firm*—Wegman, Hessler & Vanderburg

(57) ABSTRACT

The present invention relates to light weight molded plastic articles and methods of making same. More specifically, the present invention relates to a method of manufacturing a hollow-core, foamed-plastic, film-laminate article utilizing convention gas assisted molding apparatus with corresponding high production rate capabilities. The resulting film-laminate, hollow-core, foamed-plastic part comprises a class A show-face surface. The method comprises formation of a porous mass of molten plastic in the mold cavity containing the laminate. The molten plastic is cored out or hollowed by injection of gas into the mold cavity.

4 Claims, 4 Drawing Sheets

U.S. PATENT DOCUMENTS

| | | |
|---|---|---|
| 5,558,824 A | 9/1996 | Shah et al. |
| 5,639,405 A | 6/1997 | Erikson |
| 5,667,738 A * | 9/1997 | Krajcir ..................... 264/45.5 |
| 5,746,962 A | 5/1998 | Yamamoto |
| 5,900,198 A * | 5/1999 | Hori ............................ 264/50 |
| 6,169,122 B1 | 1/2001 | Blizard et al. |
| 6,197,245 B1 * | 3/2001 | Usui et al. .................. 264/572 |
| 6,221,304 B1 | 4/2001 | Harris et al. |
| 6,231,942 B1 | 5/2001 | Blizard et al. |
| 6,235,380 B1 | 5/2001 | Tupil et al. |
| 6,241,619 B1 | 6/2001 | Russell |
| 6,660,195 B2 * | 12/2003 | Usui et al. ................. 264/46.4 |

OTHER PUBLICATIONS

"Gas-assisted injection", 2 pages.

Ogando, Joseph, "Injection Molding Close-Up, What's Behind the Chrome Plate? Coinjection & Gas-Assist Molding", 2 pages.

"Structural foam injection molding", 1 page.

* cited by examiner

LIGHT WEIGHT PLASTIC TRIM PARTS AND METHODS OF MAKING SAME

CROSS-REFERENCE TO RELATED APPLICATION

This application claims the priority benefit of International PCT Application PCT/US02/23593 filed Jul. 25, 2002 and published under PCT 21(2) in the English language and U.S. Provisional Application Ser. No. 60/314,226 filed Aug. 22, 2001.

FIELD OF THE INVENTION

The present invention pertains to molded plastic parts and methods of making light weight plastic parts which incorporate a class A show-face surface. The preferred embodiment of the method in accordance with the present invention employs conventional molding equipment with corresponding high production rates.

BACKGROUND OF THE INVENTION

Utilization of thermoplastics in the manufacture of various molded articles is well known and widely exploited. Recent efforts to minimize part weight and reduce the amount of polymer required for a given piece have gained a great deal of attention. Generally, two approaches for reducing weight and material have evolved; first, use of a pressurized gas to "core-out" the center portion of the given piece; second, use of a nucleating agent and, or blowing agent, to induce foaming of the polymer. The hollow core and void areas of the foamed-plastic displace polymer material, thereby, creating a part equivalent in exterior dimension to a given solid plastic part using less polymer. An ancillary benefit of using foamed-plastic and hollow cores is that larger dimensioned molded articles can be manufactured with less sink marks and related surface deformations.

Foamed polymeric materials are well known, and typically are produced by introducing a physical blowing agent into a molten polymeric stream, mixing the blowing agent with the polymer and shaping the mixture with an extrusion die or closed mold. Exposure to atmospheric, or reduced pressure conditions causes the blowing agent to gasify, thereby forming cells in the polymer. Under controlled conditions the cells can be made to remain isolated and a closed-cell foamed material results. Under other, typically more violent foaming conditions, usually associated with less complex and less expensive molding processes, the cells rupture or become interconnected and an open-cell material results. As an alternative to a physical blowing agent, a chemical blowing agent can be used which undergoes chemical decomposition in the polymer material causing formation of a gas.

Use of uniform, microcellular, foamed-plastic results in molded parts with more visually pleasing surface finish than does an open cell foamed-plastic. However, non-conventional, more expensive, complex molding equipment and related processes are required to produce uniform, microcellular, foamed-plastics.

U.S. Pat. No. 6,169,122 B1, to Blizard et al., the disclosure of which is incorporated herein by reference thereto, discloses a method of producing articles of foamed-plastic wherein the foamed-plastic is formulated in such a way as to induce a uniform density of microcellular voids. The Blizard et al. disclosure discusses in length the various approaches taken in an effort to produce a foamed-plastic article with acceptable surface characteristics. Blizard et al. combines a chemical blowing agent and physical blowing agent to produce a foamed-plastic which exhibits uniform, microcellular, characteristics. The associated molding apparatus is non-conventional, expensive and complex.

The process of hollowing out the core may be used to provide the above benefits. However it may lead to the production of undesirable visual surface characteristics. U.S. Pat. No. 5,639,405, to Erikson, the disclosure of which is incorporated herein by reference thereto, provides an enlightened discussion of various apparatus for molding a hollow core plastic article. As disclosed in Erikson, a great deal of complexity is added to the related molding equipment in an effort to time the injection of molten plastic with the injection of gas. In the method of Erikson, supra, the timing of injecting gas with respect to injection of molten plastic is critical with regard to minimizing the resulting undesirable surface effects and maximizing resulting part integrity. The molding equipment used in Erikson employs a host of sensors and a corresponding control system to automatically adjust the injection timing.

Many of the molded plastic parts resulting from known manufacturing processes which incorporate coring and foaming steps have not yet achieved show-face characteristics with corresponding production rates acceptable for producing automotive products. Oftentimes, known coring operations with acceptable production rates induce swirling, inconsistent, patterns on the exterior surfaces of the corresponding parts and are sometimes susceptible to leaving cellular void areas on the corresponding part surfaces.

Therefore, there remains a need in the art for an economically viable method of manufacturing a light weight molded plastic part with a class A show-face surface while obtaining an acceptably high production rate. A further desire is to retain use of conventional molding equipment without added complex, expensive, systems.

SUMMARY OF THE INVENTION

The present invention employs insert molding to form articles with a film-laminate superposed over a hollow core, foamed-plastic, substrate. The film-laminate comprises a class A show-face side which, when positioned in the associated mold cavity, is placed proximate the mold. When the part is complete and in place, the foamed-plastic substrate is not visible. The show-face side of the film-laminate is the only exposed surface of the part once the part is in place.

Utilizing the film-laminate superposed over the foamed-plastic substrate allows use of conventional molding equipment with corresponding acceptable production rates. The resulting non-uniform open cell structure of the foamed-plastic substrate and its associated undesirable visual appearance is not visible when the completed part is in place. The articles produced by the method of this invention are light weight, comprise a class A show-face surface and are capable of being produced with conventional molding equipment with production rates acceptable for manufacturing automotive parts.

Further objectives and features of the present invention will become apparent in the following detail description when considered together with the drawing figures and appended claims.

DETAIL DESCRIPTION OF THE INVENTION

Figure 1:
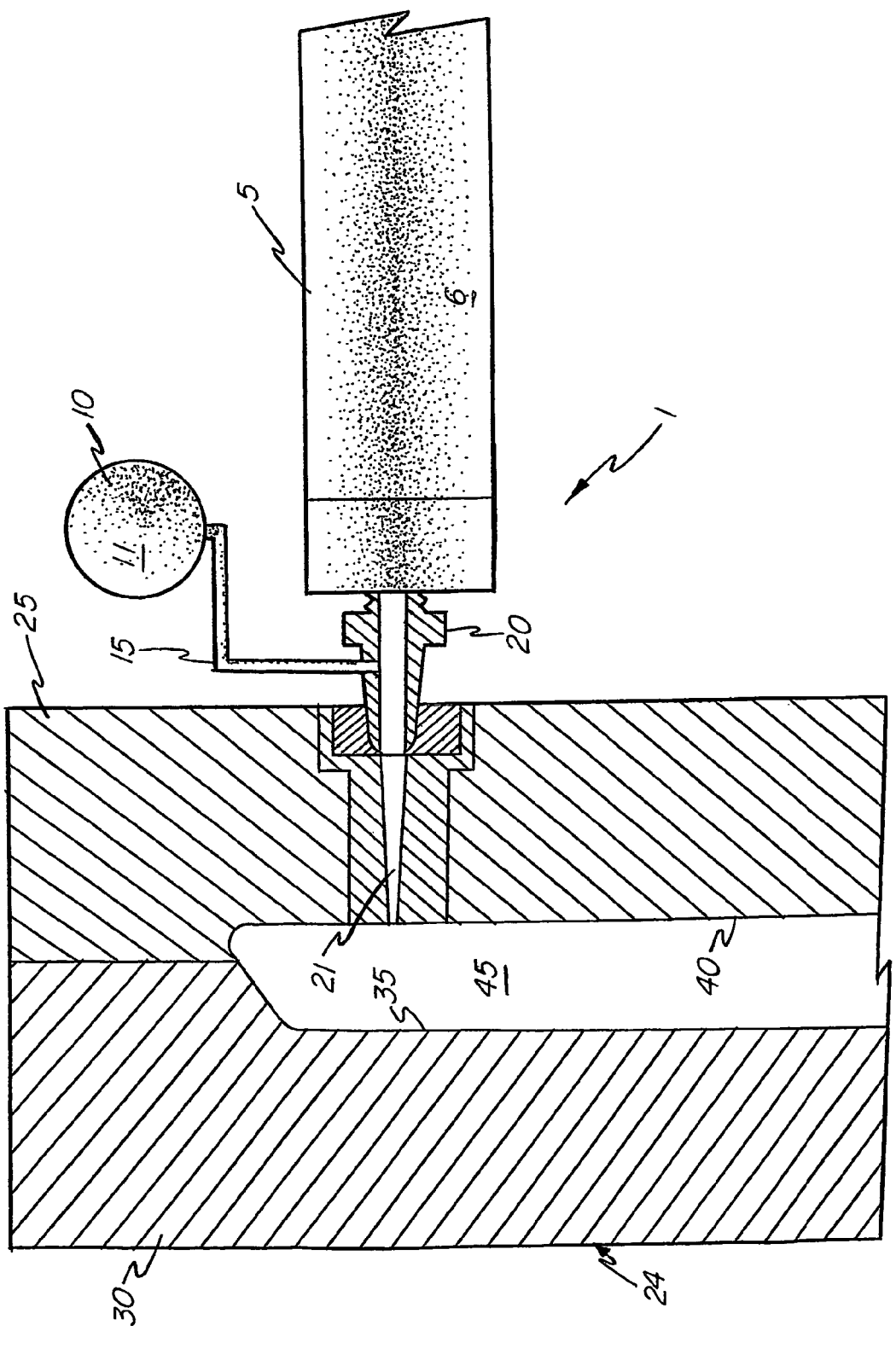
FIG. 1 depicts a sectional view of a mold with associated molten plastic and gas injection nozzle for use with the present invention.

Referring initially to FIG. 1, a gas assisted plastic molding apparatus 1 is shown for use in accordance with the present invention. The gas assisted plastic molding apparatus 1 includes: a plastic injection apparatus 5, such as a screw type ram; a mold 24 having a cavity 45 therewithin, wherein the shape of the cavity surfaces 35, 40 define the shape of the plastic article to be formed; and a pressurized gas apparatus 10. As shown in FIG. 1, the gas injection aperture 15 and the plastic injection aperture 20 merge within the sprue 21 to form a common flow path for the molten plastic 6 and gas 11 entering the mold cavity 45. The mold 24 is shown in FIG. 1 to comprise a male mold member 25 and a female mold member 30. The male mold member 25 comprises a generally convex surface 40. The female mold member 30 includes a generally concave surface 35. Many known gas assisted plastic molding apparatuses are available, the present invention shall in no way be limited to any given equipment. In accordance with the present invention, it is not required to employ the expensive, complex, molding apparatus as disclosed in Erikson and Blizard et al., supra Relatively simplistic, inexpensive, molding apparatus is available for use with the present invention. However, molding equipment such as disclosed in Blizard et al. and Erikson, supra., can be used in accordance with an alternate embodiment of the present invention.

The relative positions of the gas 11 injection aperture 15 and plastic 6 injection aperture 20, as shown in FIG. 1, depict a preferred embodiment of the present invention. The molding apparatus configurations as disclosed in Blizard et al. and Erikson, supra., can be used in lieu of the apparatus 1 as shown in FIG. 1. As shown in FIG. 1, the sprue 21 is positioned such that the injected material enters the mold cavity 45 from the male mold member 25 side. As described below, the injected material entering the male mold member 25 side of mold cavity 45 facilitates positioning of film-laminate 50.

Figure 2:
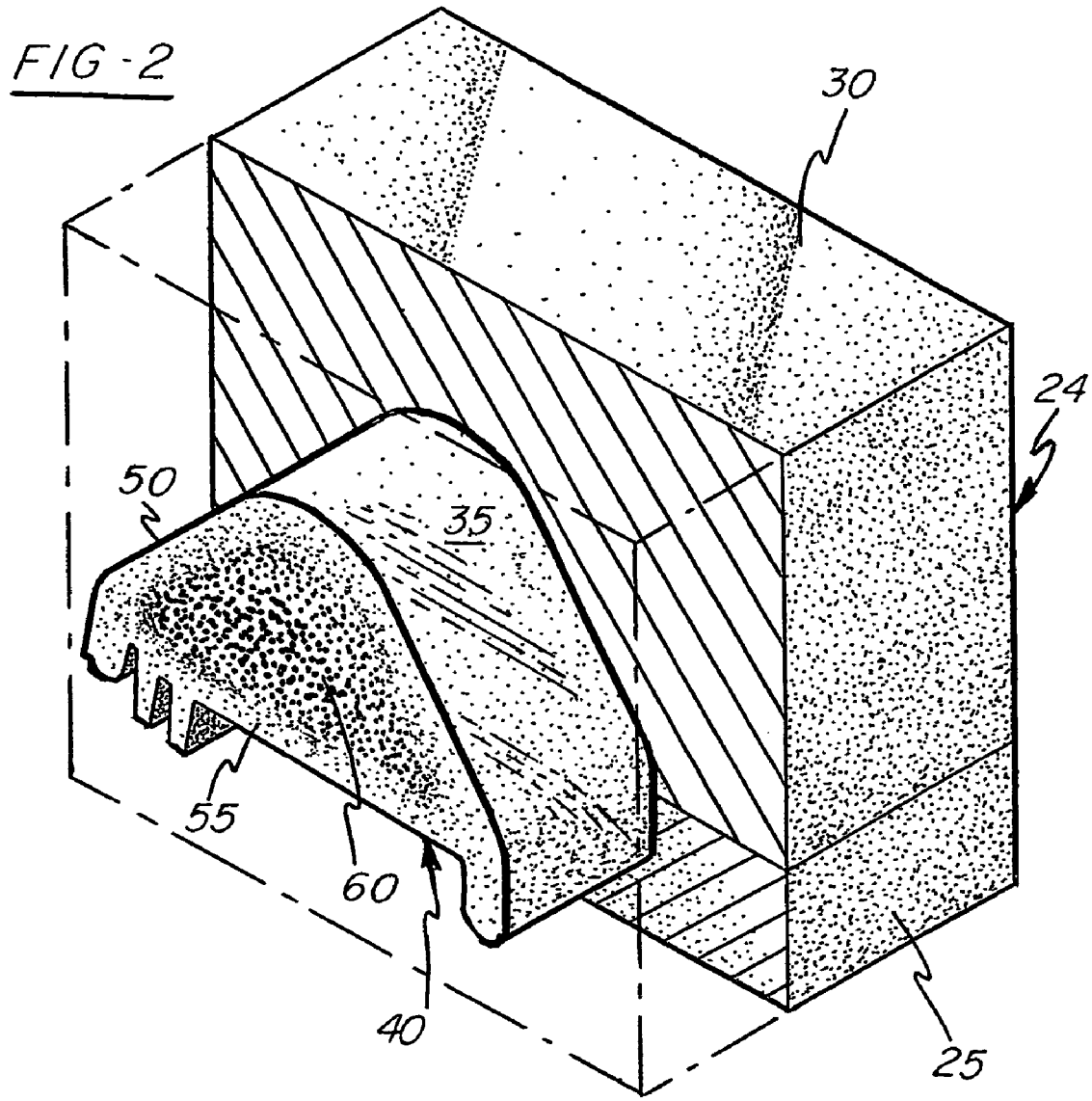
FIG. 2 is a perspective view, partially in phantom, of a film-laminate inserted in a mold cavity with foamed-plastic injected prior to being cored-out.

Turning to FIG. 2, there is shown a sectional view, partially in phantom, of mold 24 with film-laminate 50 and foamed-plastic therewithin. The foamed-plastic is depicted in FIG. 2 as being comprised partially of small cells 55 and partially of large cells 60. Depending on the chosen molding process, the actual configuration and density of cells 55, 60 in the foamed-plastic will very.

A thermoplastic olefin (TPO) such as modified-polypropylene (modified PP) is the preferred polymer 6 for use with the present invention. However, any crystalline, semi-crystalline or non-crystalline polymer capable of being foamed may be used. Typical desirable polymers include, but are not limited to polystyrene, nylon, polycarbonate, polyesters, vinyl acetate, polyvinyl pyrrolidones, polyethylene terephthalate (PET), polylactic acid, nylon 6, nylon 6/6, polyethylene, polyvinylchloride (PVC), polypropylene, syndiotactic polystyrene, and polyacetal. In certain case the semi-crystalline polymer may be blended with non-semi-crystalline polymers. The semi-crystalline polymer may be blended with other semi-crystalline material.

Nitrogen ($N_2$) is a preferred gas 11 for operation with the apparatus 1. The term "physical blowing agent" is commonly used when referring to the gas 11 of a gas assisted molding process. Other physical blowing agents that are operable with the apparatus of FIG. 1 are either gases having ready solubility in hydrocarbons such as difluorodichloromethane, hexafluotoethanes, tetrafluoromethane, ethane, methane, dimethyl ether, carbon dioxide, and the like, or gases having limited solubility in hydrocarbons such as air, argon, chlorofluorocarbons and the like in addition to nitrogen.

Another common foaming method includes the addition of "chemical blowing agents" into the molten polymer resin or resins with a chemical blowing agent added. The term "nucleating agent" is commonly used when referring to either a gas or chemical blowing agent. Some commonly used nucleating agents are talc, calcium carbonate ($CaCO_3$), titanium oxide ($TiO_2$), barium sulfat ($BaSO_4$), and zinc sulfide (ZnS). Blizard et al., supra., contains a detail discussion of the terms "nucleating," "nucleation," "nucleated" and "non-nucleated."

The film-laminate 50 used in these insert molding techniques may comprise a backing sheet to which paint layers are adhered to form a colored side of the laminate. Typically, the backing sheet comprises an extruded thermoplastic sheet. In such paint film-laminates, a paint film-laminate, comprising a cast dried continuous paint coating, is provided over the backing sheet. The film-laminate 50 may consist of a monocoat, a clear coat over a base coat or a clear coat and a base coat with interposed print or design. The film-laminate 50, including base coat, clear coat and print or design, if desired, may, for example, range from about 0.5–4 mil. in thickness. The film laminate may also include a metallic type finish or outer surface in addition to the use of colored outer surfaces.

The film-laminates are typically provided in a roll, unwound, then trimmed to a proper "preform" size and shape, ready for insertion into the injection mold. The preform is usually placed along the cavity side of the mold, the female mold member 30 herein, with the painted side (show-face) thereof facing the mold cavity surface.

In some instances, the pre-sized film-laminate 50 may be placed along the core side of the mold 24 unshaped. The mold 24 is then clamped and the desired molten resin is injected into the mold cavity 45 from the male mold member 25 side. Heat and pressure conditions in the mold 24 partially melt the backing sheet and a melt bonding or fusion of the injected resin and film-laminate 50 occur. Injection molds used for these processes are commonly rear or edge gated so that the molten resin is directed along the backside, the male member 25 side herein, of the film-laminate 50, pressing the show-face side of the film-laminate 50 against the surfaces 35, 40 of the mold cavity 45. Techniques utilized to insert mold plastic parts covered by such film-laminates 50 are disclosed, for example, in U.S. Pat. Nos. 5,599,608; 5,783,287; 5,746,962 and 6,168,742 of common assignment herewith. The subject matter of these disclosures is incorporated herein by reference thereto.

In the preferred embodiment of the present invention, the molten polymer 6 merges with the gas 11 such that the two become mixed with one another within the sprue 21. The initial mixture takes place under conditions which prevent nucleation, such as high pressure within the sprue 21 as shown in FIG. 1. In the preferred embodiment of the present invention, the molten polymer 6 is injected into the sprue 21 followed by gas 11 at which point the polymer 6 and gas 11 mixture flow simultaneously. The molten polymer 6 and gas 11 mixture flow into the mold cavity 45 until the desired volume of mixture is injected, at which time both the polymer 6 and gas 11 flows are interrupted. As disclosed within Blizard et al., supra., the mixture of the nucleating agent can take place other than in the sprue. Additionally, a chemical nucleating agent can be introduced.

Figure 3:
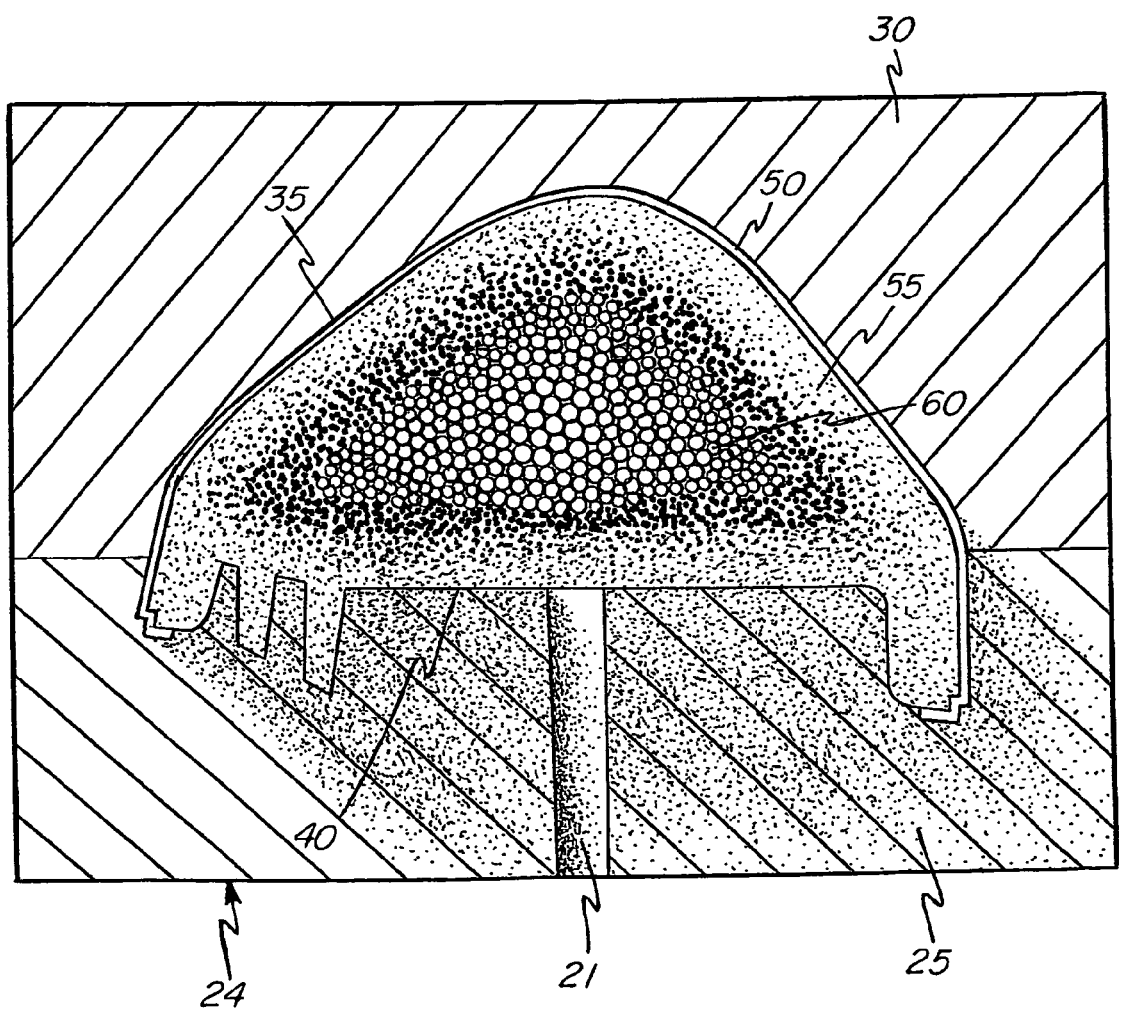
FIG. 3 depicts a sectional view of FIG. 2.

As shown in FIGS. 2 and 3, nucleation occurs, under reduced pressure conditions, within the mold cavity 45. As best depicted in FIG. 3, small cells 55 are formed generally around the perimeter of the mold cavity 45; large cells 60 tend to develop within the center portion. In the preferred embodiment, the nucleation would typically be referred to as being violent, as discussed above, and would result, at least partially, in an open cell foamed-plastic.

Figure 4:
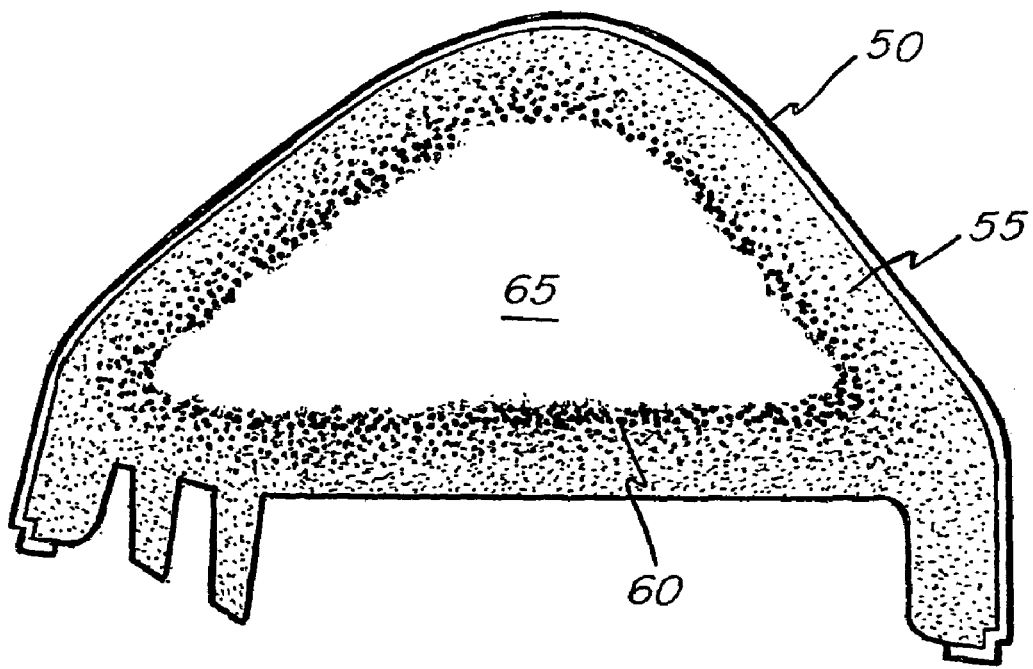
FIG. 4 is a sectional view of a resulting part with film-laminate superposed over a hollow core foamed-plastic substrate.

Subsequent to injection of the molten polymer 6 and gas 11 mixture, and nucleation thereof within the mold cavity 45, gas 11, alone, is injected into the mold cavity 45 resulting in the hollow core 65 as shown in FIG. 4. As can be seen in FIG. 4, the generally open cell foamed-plastic is pressed against the outer perimeter of the mold cavity 45 resulting in a layer of small cells 55 closest to the surface 40 and film-laminate 50 with a narrow layer of large cells 60 confined therewithin. The large cells 60 surround the hollow core 65. As can be seen in FIG. 4, the film-laminate 50 is superposed over the hollow core, foamed-plastic, substrate resulting in the desired hollow core film-laminate foamed-plastic article 70.

If so desired, the core of the foamed-plastic article 70 may remain filled with large cells 60. However, the resulting part 70, with hollow core, is generally much lighter than is a filled-core part.

As above stated, the porous mass of molten plastic in the mold cavity can be provided via admixing gas and the molten polymer in the cavity or by utilization of the polymer in combination with chemical blowing agents. This porous mass of molten plastic is 'cored' so as to form a hollow article, preferably by admission of pressurized gas into the mold cavity. The mold cavity is opened and a hollow paint film-covered plastic part is ejected therefrom. The plastic includes open and/or closed cellular constituents along with a hollow core.

The invention claimed is:

1. Method of making a film-laminate foamed-plastic part by insert-molding of a film-laminate over a foamed-plastic substrate, to form a show-face surface of said part, said method comprising:
    (a) providing a male mold member including a surface defining a convexity therein and a female mold member having a surface defining a concavity therein, said male mold member and said female mold member together defining a mold cavity;
    (b) providing a film-laminate comprising a show-face side;
    (c) inserting said film-laminate into said mold cavity and positioning said show-face side proximate to said female mold member concavity, then clamping said mold cavity shut;
    (d) injecting molten plastic and gas simultaneously into said clamped mold cavity under pressure conditions such that said gas is incorporated into the flow of molten plastic wherein a molten mixture of plastic and gas is formed while preventing nucleation of said molten plastic, said molten mixture entering said mold cavity from the male mold member side whereby said film-laminate is superposed over said molten mixture;
    (e) then subjecting said molten plastic to reduced pressure conditions within the mold cavity to permit nucleation of said molten plastic to form a number of small cells surrounded by a number of larger cells; and then
    (f) further injecting gas into said mold cavity such that a hollow core is formed in said molten foamed-plastic substrate.

2. The method of claim 1, wherein said film-laminate is pre-formed prior to inserting into said mold cavity.

3. The method of claim 1, wherein said foamed-plastic substrate comprises a thermoplastic olefin nucleated with nitrogen.

4. The method of claim 2, wherein said foamed-plastic substrate comprises a thermoplastic olefin nucleated with nitrogen.

* * * * *